United States Patent
Hwang (10) Patent No.: US 7,475,214 B2
(45) Date of Patent: Jan. 6, 2009

(54) METHOD AND SYSTEM TO OPTIMIZE JAVA VIRTUAL MACHINE PERFORMANCE

(75) Inventor: Jinwoo Hwang, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 11/464,944

(22) Filed: Aug. 16, 2006

(65) Prior Publication Data

US 2008/0046673 A1 Feb. 21, 2008

(51) Int. Cl.
*G06F 12/00* (2006.01)
*G06F 9/44* (2006.01)
*G06F 9/50* (2006.01)

(52) U.S. Cl. ............... 711/170; 717/104; 717/118; 717/127; 717/128; 717/130; 717/131; 717/148; 717/151

(58) Field of Classification Search .................. None
See application file for complete search history.

(56) References Cited

U.S. PATENT DOCUMENTS

| | | | |
|---|---|---|---|
| 5,699,539 A * | 12/1997 | Garber et al. ............ 711/2 |
| 6,065,019 A * | 5/2000 | Ault et al. ............... 707/206 |
| 6,658,652 B1 | 12/2003 | Alexander, III et al. |
| 6,832,302 B1 * | 12/2004 | Fetzer et al. ............ 711/170 |
| 6,886,085 B1 * | 4/2005 | Shuf et al. ............... 711/159 |
| 7,340,493 B2 * | 3/2008 | Lake ....................... 707/206 |
| 2002/0073283 A1 * | 6/2002 | Lewis et al. ............. 711/133 |
| 2005/0039086 A1 | 2/2005 | Krishnamurthy et al. |
| 2005/0240641 A1 | 10/2005 | Kimura et al. |
| 2008/0065708 A1 * | 3/2008 | Lake ....................... 707/206 |

* cited by examiner

*Primary Examiner*—Jack A Lane
(74) *Attorney, Agent, or Firm*—Cantor Colburn LLP; Martin McKinley (57) ABSTRACT

A method to assist a software developer in optimizing performance of a Java virtual machine (Jvm) is disclosed. The method includes creating a model to predict future usage of heap memory by the Jvm. In response to the time series analysis model having an upward trend of heap memory usage, advising the developer to review a heap dump to determine if a possible memory leak exists. In response to the time series analysis model having a horizontal asymptote at a predicted future time, advising the developer to specify the maximum limit of heap memory as a function of the horizontal asymptote. In response to a heap exhaustion error, which indicates a requested usage of heap memory by the Jvm greater than a maximum limit of heap memory, determining a likely cause of the heap exhaustion error, and advising the developer to take appropriate actions to optimize the Jvm performance.

14 Claims, 4 Drawing Sheets

METHOD AND SYSTEM TO OPTIMIZE JAVA VIRTUAL MACHINE PERFORMANCE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates to an improved data processing system and, in particular, to a method and system for optimizing performance in a data processing system. Still more particularly, the present invention provides a method and system for a software program development tool for enhancing performance of a software program through software modeling.

2. Description of Background

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine the data processing system to determine resource consumption as various software applications are executing within the data processing system. For example, a performance tool may identify the most frequently executed modules and instructions in a data processing system, or may identify those modules, which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas that might benefit most from improvements to the code.

Another trace technique involves program sampling to identify certain locations in programs in which the programs appear to spend large amounts of time. This technique is based on the idea of interrupting the application or data processing system execution at regular intervals, so-called sample-based profiling. At each interruption, information is recorded for a predetermined length of time or for a predetermined number of events of interest. For example, the program counter of the currently executing thread, which is a process that is part of the larger program being profiled, may be recorded during the intervals. These values may be resolved against a load map and symbol table information for the data processing system at post-processing time, and a profile of where the time is being spent may be obtained from this analysis.

For example, isolating such hot spots to the instruction level permits compiler writers to find significant areas of suboptimal code generation at which they may thus focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Another runtime statistic that may be analyzed by software developers is memory allocation. A trace tool may log allocation/deallocation requests and the amounts of memory allocated for each memory allocation/deallocation request. Memory allocation information may allow a software developer to analyze memory leakage problems. As an application executes, it stores and retrieves data in a variety of static and dynamic data structures. Statically allocated data structures are declared within the source code, and the compiler allocates storage space for the static data structure. When the application is loaded into memory, the static data structure has a predetermined amount of memory reserved for it, and the application cannot dynamically deallocate this memory. In some programming languages, arrays are statically allocated.

Other data structures can be dynamically allocated within memory when requested either by the application or by the runtime environment. A portion of memory is dynamically provided for the data structure or data object, and after the application is finished using the data structure, the memory space for the data structure is dynamically deallocated.

A memory leak occurs when the dynamically allocated memory space is not properly deallocated; either the application or the runtime environment may lose its pointer or memory reference to the dynamically allocated memory space, and once lost, the pointer or memory reference may not be retrieved. However, the memory allocation mechanism, which may be the operating system, will not reallocate the memory space because it was not deallocated, and a portion of memory is no longer being utilized. If one considers a newly initialized system as having a "full" memory, then the memory may slowly lose portions of its allocable space until a "low" memory condition occurs in which no more memory may be allocated, which usually causes the system to crash soon after this condition arises. Memory leaks are extremely difficult to find as the first and only symptom of a memory leak may be a system crash, which may occur significantly after the "leaky" code has executed. Using an object-oriented language like Java, the Java virtual machine (Jvm) may allocate memory from a "Java Heap" where the memory heap allocations and deallocations are hidden from the Java programmer. The allocations are performed by the Jvm when new objects are specified, such as, "String ABC="ABC". The Jvm uses the implied new constructor in this case as it allocates the string "ABC". The deallocations are done by the Jvm asynchronously at Garbage collection (GC) time when there are no longer any references to the ABC string; that is, the object is no longer referenced. Because these allocations and deallocations are done by the Jvm, the Java programmer is usually not aware of the cost associated with the objects created and may not take care to eliminate references to objects that are not required. In the case of Java, the memory leaks will also cause more frequent GCs, which in turn, reduce performance.

Therefore, it would be advantageous to provide a method and system for accurate memory leak prediction in an object-oriented environment.

SUMMARY OF THE INVENTION

The shortcomings of the prior art are overcome and additional advantages are provided through the provision of a method and system for by predicting possible memory leaks, determining likely causes of memory fragmentation, and providing a software developer with solutions to optimize Jvm performance.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which will provide a software development tool to predict possible memory leaks before they occur as well as providing a software developer with additional information to improve the resource use of an application developed for use within the Jvm. The software development tool will also provide guidance to locate and solve problems that may be the cause of memory fragmentation. This will result in an increase in application stability, savings in hardware and software resources, and increased application performance.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
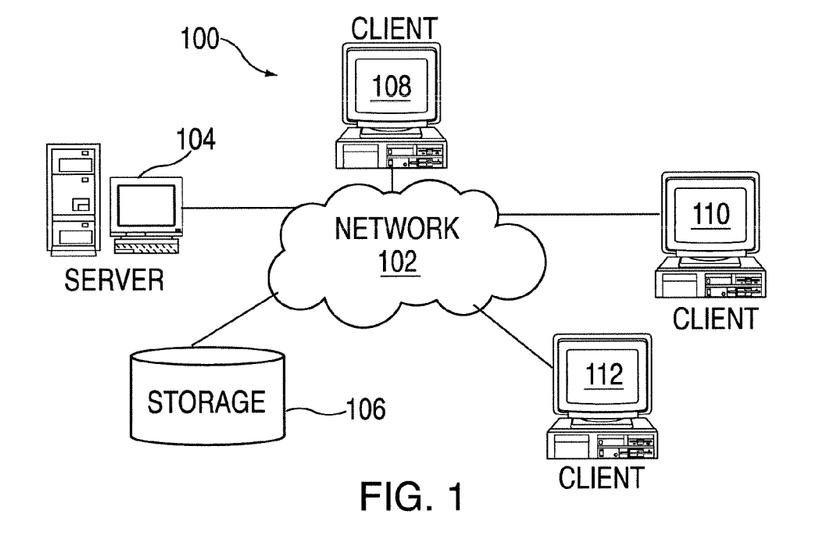
FIG. 1 illustrates one example of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with a storage unit 106. In addition, clients 108, 110, and 112 also are connected to the network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
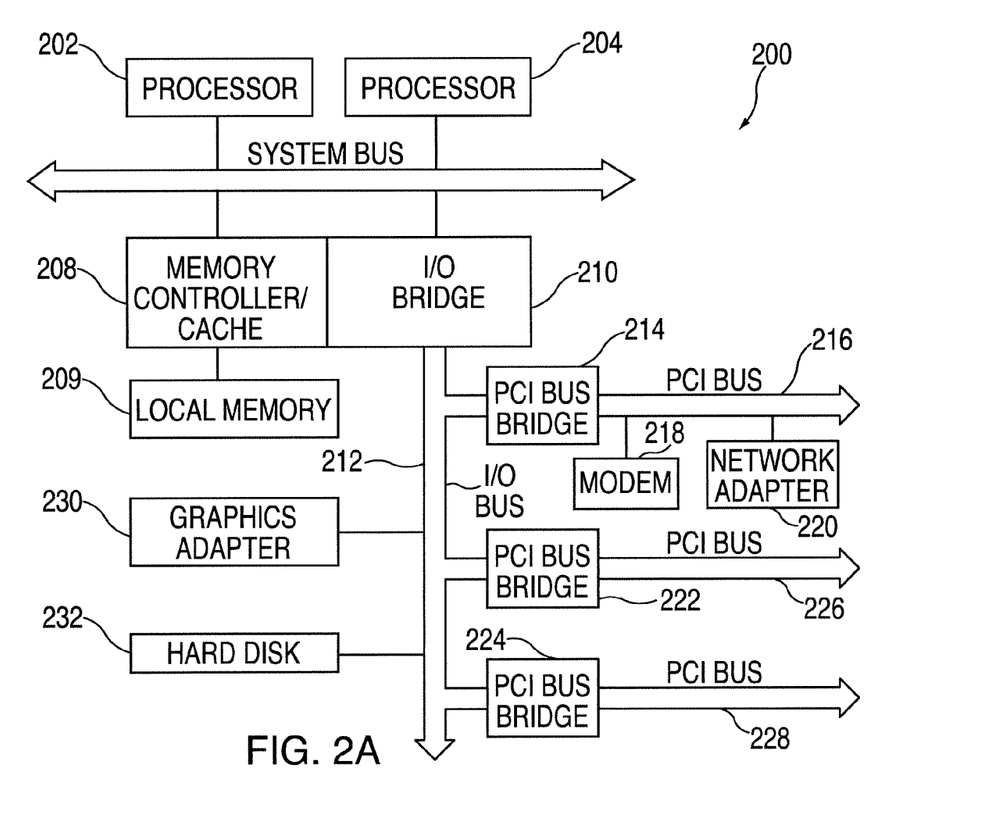
FIGS. 2A and 2B illustrate examples of block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 maybe integrated as depicted.

Peripheral component interconnect (PCI) bus bridge 214 connected to I/0 bus 212 provides an interface to PCI local bus 216. A modem 218 may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and a program storage device, also herein referred to as a hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drives and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
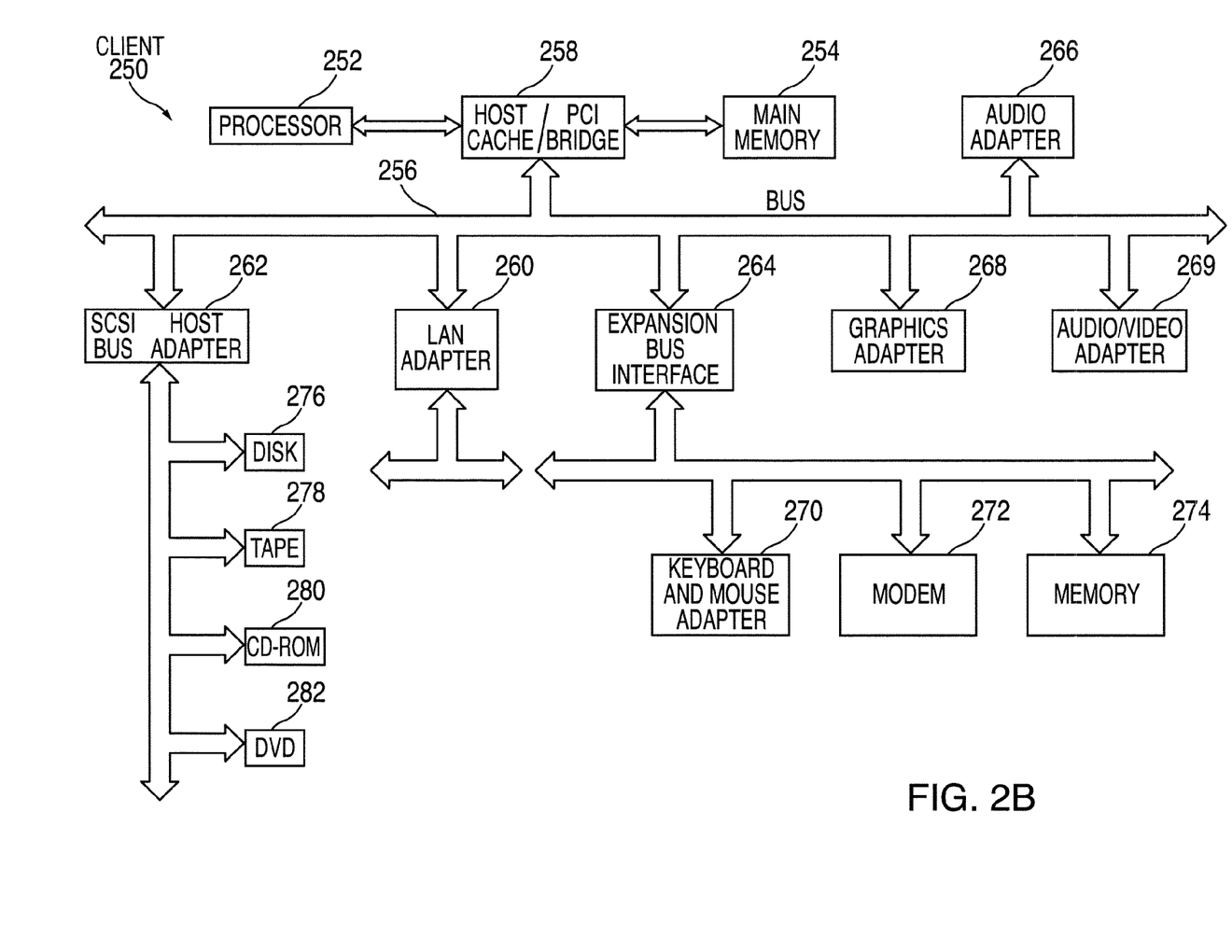

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD drive 282 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS for Business.™. or OS/2.™., which are available from International Business Machines Corporations.™. JavaOS is loaded from a server on a network to a network client and supports Java programs and applets. Some characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for optimizing software performance. Although the present invention may operate on a variety of computer platforms and operating systems, it may also operate within a Java runtime environment. Hence, the present invention may operate in conjunction with a Java virtual machine (Jvm) yet within the boundaries of the Jvm as defined by Java standard specifications. In order to provide a context for the present invention, portions of the operation of the Jvm according to Java specifications are herein described.

Figure 3A:
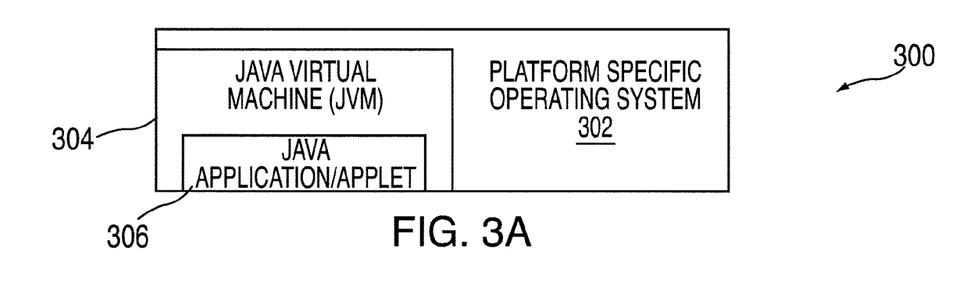
FIG. 3A illustrates one example of a block diagram depicting the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. Jvm 304 is one software application that may execute in conjunction with the operating system. Jvm 304 provides a Java run-time environment with the ability to execute a Java application or applet 306, which is a program, servlet, or software component written in the Java programming language. The computer system in which Jvm 304 operates may be similar to data processing system 200 or computer 100 described above. However, Jvm 304 may be implemented in dedicated hardware on a so-called Java chip, Java-on-silicon, or Java processor with an embedded picoJava core.

At the center of a Java run-time environment is the Jvm, which supports all aspects of Java's environment, including its architecture, security features, mobility across networks, and platform independence.

The Jvm is a virtual computer, i.e. a computer that is specified abstractly. The specification defines certain features that every Jvm must implement, with some range of design choices that may depend upon the platform on which the Jvm is designed to execute. For example, all Jvms must execute Java bytecodes and may use a range of techniques to execute the instructions represented by the bytecodes. A Jvm may be implemented completely in software or somewhat in hardware. This flexibility allows different Jvms to be designed for mainframe computers and personal digital assistants (PDA)s, for example.

The Jvm is the name of the virtual computer component that actually executes Java programs. Java programs are not run directly by the central processor but instead by the Jvm, which is itself a piece of software running on the processor. The Jvm allows Java programs to be executed on different platforms, as opposed to only the one platform for which the code was compiled. Java programs are compiled for the Jvm. In this manner, Java is able to support applications for many types of data processing systems, which may contain a variety of central processing units and operating system architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the Jvm that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A Jvm must load class files and execute the bytecodes within them. The Jvm contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for just-in-time compiling a method. The native machine code for the method is then cached and reused upon the next invocation of the method. The execution engine may also be implemented in hardware and embedded on a chip so that the Java bytecodes are executed natively. Jvms usually interpret bytecodes, but Jvms may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code.

When an application is executed on a Jvm that is implemented in software on a platform-specific operating system, a Java application may interact with the host operating system by involving native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
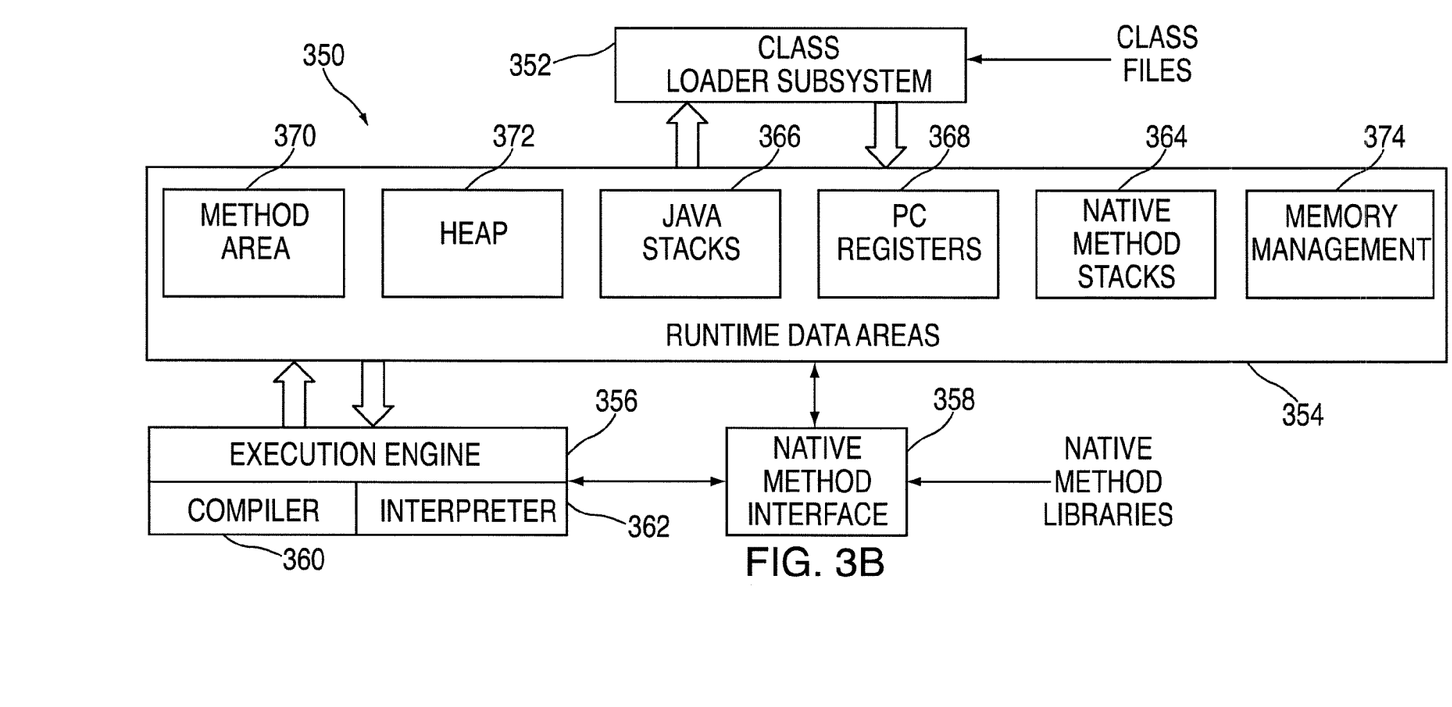
FIG. 3B illustrates one example of a block diagram depicting a Java virtual machine in accordance with an embodiment of the present invention.

With reference now to FIG. 3B, a block diagram of a Jvm 350 is depicted in accordance with a preferred embodiment of the present invention. Jvm 350 includes a class loader subsystem 352, which is a mechanism for loading types, such as classes and interfaces, given fully qualified names. Jvm 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by Jvm 350 to execute a program.

Java stacks 366 are used to store the state of Java method invocations. When a new thread is launched, the Jvm 350 creates a new Java stack for the thread. The Jvm 350 performs only two operations directly on Java stacks 366: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the Jvm pushes a new frame onto the Java stack of the thread. When the method completes, the Jvm pops the frame for that method and discards it. The Jvm does not have any registers for holding intermediate values; any Java instruction that requires or produces an intermediate value uses the stack for holding the intermediate values. In this manner, the Java instruction set is well defined for a variety of platform architectures.

PC registers 368 are used to indicate the next instruction to be executed. Each instantiated thread gets its own PC register (program counter) and Java stack. If the thread is executing a Jvm method, the value of the PC register indicates the next instruction to execute. If the thread is executing a native method, then the contents of the PC register are undefined.

Native method stacks 364 store the state of invocations of native methods. The state of native method invocations is stored in an implementation-dependent way in native method stacks, registers, or other implementation-dependent memory areas. In some Jvm implementations, native method stacks 364 and Java stacks 366 are combined.

Method area 370 contains class data while heap 372 contains all instantiated objects. The Jvm specification strictly defines data types and operations. Most Jvms 350 choose to have one method area and one heap, each of which is shared by all threads running inside the Jvm 350. When the Jvm 350 loads a class file, it parses information about a type from the binary data contained in the class file. It places this type information into the method area 370. Each time a class instance or array is created, the memory for the new object is allocated from heap 372. Jvm 350 includes an instruction that allocates memory space within the memory for heap 372 but includes no instruction for freeing that space within the memory. Memory management 374 in the depicted example manages memory space within the memory allocated to heap 370. Memory management 374 may include a Garbage Collector, which automatically reclaims memory used by objects that are no longer referenced. Additionally, a Garbage Collector also may move objects to reduce heap fragmentation.

The nature of the Jvm 350 is that each allocation of memory is specified to be a contiguous section of memory. Accordingly, any fragmentation of the heap 372 will result in reduced performance of the Jvm 350, and may lead to a heap exhaustion, which is an attempt to use more heap memory than has been set as a maximum limit by the developer.

Fragmentation may be caused by if an initial heap 372 size, as related to a maximum heap 372 size is too large. In an embodiment, if the initial size is greater than or equal to 50% of the maximum heap size, excessive fragmentation may result.

Fragmentation may also be caused as a result of using large object requests. Requests for large, contiguous, sections of memory may quickly lead to a shortage of contiguous sections of memory for subsequent requests. In an embodiment, it is preferred that object requests be kept to less than 5 megabytes (MB) in size. It is a matter of programming technique by the software developer to ensure that requests for large amounts of memory are redistributed into smaller sized object requests, such as by using buffers, for example.

Another cause of fragmentation is improper reservation of memory space within the method area 370 for the storage of class files. Class files are each of a fixed size, and are not able to be moved during the defragmentation of Garbage Collection. The number of class files used during operation of an application is not fixed, and may change with respect to time, because class files may be unloaded from the method area 370 if they are not needed. Accordingly, it will be beneficial to ensure that the proper amount of memory space is set aside, or reserved, for the class files. In an embodiment, it is preferred to reserve enough memory space to hold about 10 percent more class files than a maximum number of actual class files that an application may need at any given time.

As described above, running out of available heap space as a result of memory leakage may ultimately lead to heap exhaustion. Additionally, excessive fragmentation may also lead to heap exhaustion. In the case of heap exhaustion caused by fragmentation, it may not be that there is no longer available heap space, but rather that there is no longer a portion of contiguous heap space large enough, that is available to fulfill the request for contiguous memory that has been made.

Accordingly, it will be desirable to have a software development tool, running as a monitor or agent, along with the Jvm 350 to predict memory leakage before it leads to a heap exhaustion error. In an embodiment, the software development tool will also recommend, or advise, to the software developer steps that may be taken to avoid heap exhaustion that is caused by memory fragmentation. In an embodiment, memory leakage is predicted by looking at the historical data of memory usage to predict future trends. In embodiment, a time series model analysis of the historical memory usage is used to predict future memory usage. In an embodiment, the time analysis to predict future memory usage is performed by at least one of the following algorithms: a Box-Jenkins Auto Regressive Integrated Moving Average (ARIMA) model, a Box-Jenkins Multivariate, sometimes called an Auto Regressive Moving Average Vector (ARMAV) model, and a Holt-Winters Exponential Smoothing model. In an embodiment, the Holt-Winters Exponential Smoothing model used may be any of a single, double or triple exponential smoothing model.

In an embodiment, if the time series analysis model predicts an upward trend to the heap memory usage, the software development tool will warn the developer that there is a possibility of memory leakage, and that the developer should review a Java heap dump, which is a detailed "snapshot" of the Jvm heap 372, to ensure that such a memory leakage condition does not exist. An exemplary Java heap dump may include information such as the objects that are in the heap, the address of each object, description of the object, the size of the object, references of the object, and classes, for example.

In an embodiment, if the time series analysis model predicts a horizontal asymptote, that is, a maximum value that the predicted memory usage approaches (but does not attain) as a predicted future time value increases to infinity, the software development tool will advise the developer to increase the maximum heap limit as a function of the maximum predicted memory usage value. In an embodiment, the software development tool will advise the developer to increase the maximum heap limit by 30% above the asymptotic maximum predicted memory usage value.

While an embodiment of the invention has been described to advise the software developer to increase the maximum heap limit as a linear percentage of the asymptotic predicted memory usage, it will be appreciated that the scope of the invention is not so limited, and that the invention will also apply to other recommendations of the maximum heap, such as using a quadratic or exponential function, for example.

In an embodiment, in addition to predicting potential memory leak problems, the software development tool is configured to diagnose, and provide guidance to the software developer to solve causes of a heap exhaustion error that may be output via a verboseGC output.

Following a heap exhaustion error, if the remaining available heap space is less than a specified minimum threshold, the software development tool is configured to advise the developer to review the Java heap, in order to determine if there is a memory leakage, or if the maximum heap limit should be adjusted. It may be that the available remaining memory has fallen below the threshold because of the memory leak, or it may be that the specific application requires additional heap memory for proper operation. In an embodiment, a typical, expected, value of available heap space is between 20 and 30 percent of the maximum heap limit, and the specified minimum threshold has a value of 10 percent.

While an embodiment of the invention has been described to evaluate the amount of available memory space as a linear percentage of the maximum heap limit, it will be appreciated that the scope of the invention is not so limited, and that the invention will also apply to other evaluations of the available memory, such as using a quadratic or exponential function, for example.

Following a heap exhaustion error, if the remaining available heap space is not less than the specified minimum threshold, it is possible that fragmentation is the cause of the heap exhaustion error, rather than the memory leakage or need for additional heap memory. As described above, fragmentation may have multiple causes within the Java application.

If the initial heap size is greater than a specified size threshold or a ratio to the maximum heap limit, it may be the cause of fragmentation that may have led to the heap exhaustion error. In an embodiment, if the initial heap size is greater than the specified size ratio threshold, the development tool will advise the developer to reduce the initial heap size. In an embodiment, the specified size ratio threshold is exceeded if the initial heap has a value greater than 50 percent of the maximum heap limit.

While an embodiment of the invention has been described to evaluate the initial heap size as a linear percentage of the maximum heap limit, it will be appreciated that the scope of the invention is not so limited, and that the invention will also apply to other evaluations of the initial heap size, such as using a quadratic or exponential function, for example.

If objects are greater than a specific object threshold value, and are attempted to be located as contiguous blocks within the heap, it may be the cause of fragmentation that may have led to the heap exhaustion error. In an embodiment, if the object threshold value exceeds a threshold value, the development tool will advise the developer to avoid the use of large object requests for heap memory, that is, that the developer may need to enhance the portions of the program that are configured to break the objects into smaller pieces. In an embodiment, the object size threshold value is 5 MB.

While an embodiment of the invention has been described to evaluate the object size threshold based upon a fixed size threshold, it will be appreciated that the scope of the invention is not so limited, and that the invention will also apply to other evaluations of the object size, such as a linear percentage of total available memory space, a quadratic, or exponential function, for example.

If enough memory space is not reserved for the class files, fragmentation may result, which may provide the heap exhaustion error. Accordingly, if the development tool determines that an amount of memory reserved for storing a number of class files exceeds an actual amount of memory consumed by storing the maximum number of actual classes used by less than a specified minimum class threshold percentage, it will advise the developer to increase the class size, or amount of memory reserved for storing the class files. In an embodiment, the development tool will advise the developer to increase the amount of memory reserved for storing the class files to be 10 percent greater than the amount of memory consumed by storing the maximum number of actual class files used.

While an embodiment of the invention has been described to advise the software developer to increase the number of reserved classes as a linear percentage of the maximum number of actual classes used, it will be appreciated that the scope of the invention is not so limited, and that the invention will also apply to recommendations of the maximum heap, such as using a quadratic or exponential function, for example.

Figure 4:
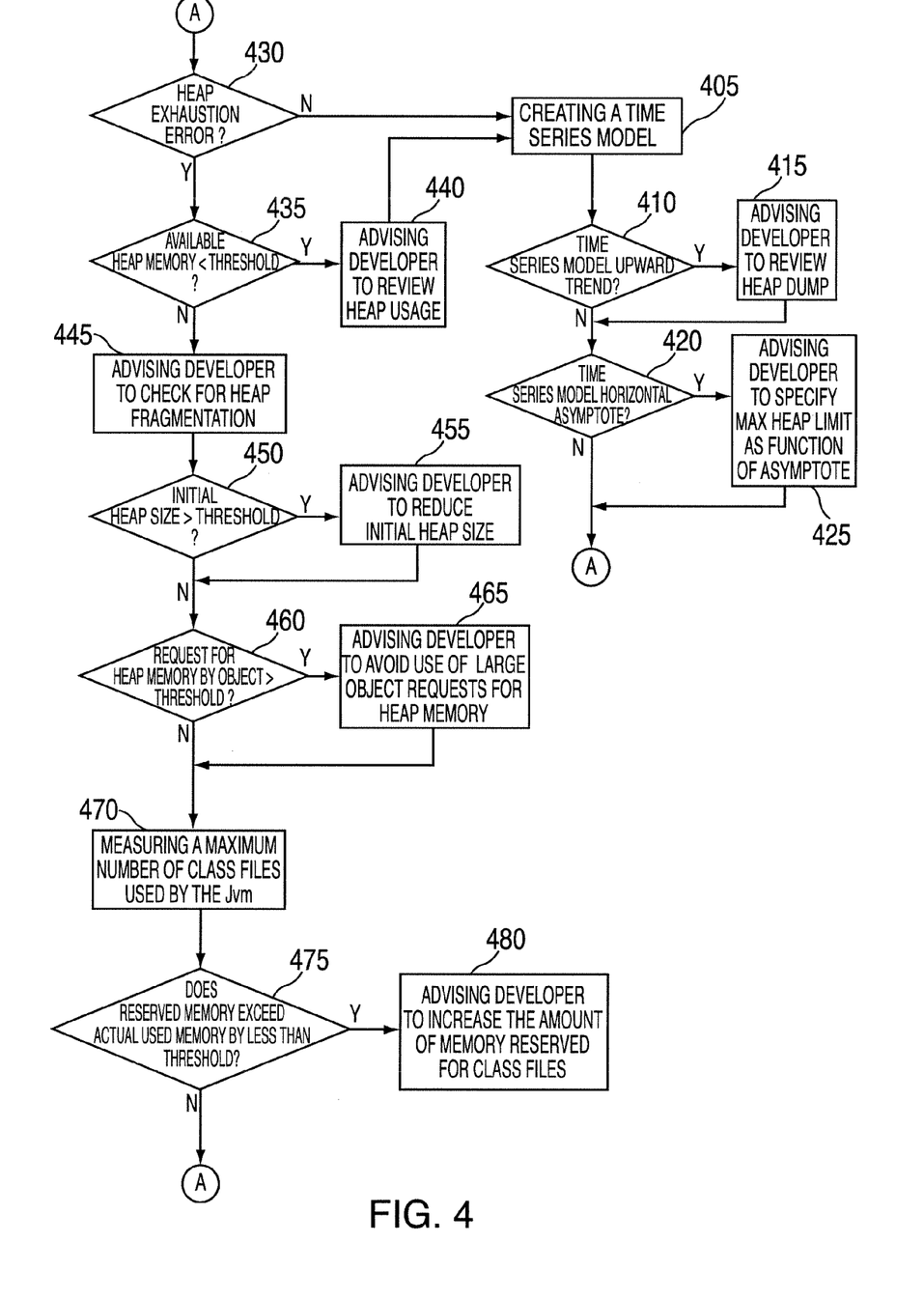
FIG. 4 illustrates one example of a flowchart of a method to optimize performance of a Java virtual machine in accordance with an embodiment of the present invention.

In view of the foregoing, the development tool performs the method of optimizing performance of the Jvm 350. Referring now to FIG. 4, a flow chart 400 of an exemplary embodiment of the method of optimizing the performance of the Jvm 350 is depicted.

The method begins with determining 430 if the heap exhaustion error, which indicates the requested usage of heap memory by the Jvm 305 greater than the maximum limit, has occurred. In response to determining 430 that the heap exhaustion error has occurred, determining 435 if currently available heap memory 372, as a percentage of the maximum limit, meets a specified minimum threshold.

In response to determining 430 that the heap exhaustion error has occurred, and determining 435 that the percentage of available memory has fallen below the minimum threshold, advising 440 the developer to review usage of the heap memory 372.

In response to determining 430 that the heap exhaustion error has occurred, and determining 435 that the percentage of available memory is above the minimum threshold, advising 445 the developer to check for fragmentation of the heap memory 372.

In response to determining 430 that the heap exhaustion error has occurred, and determining 435 that the percentage of available memory is above the minimum threshold, determining 450 if an initial heap size selected by the developer exceeds at least one of: a size threshold; and, a ratio to the maximum limit threshold. In response to determining 450 that the at least one of the size threshold and the ratio threshold has been exceeded, advising 455 the developer to reduce the initial heap size.

In response to determining 430 that the heap exhaustion error has occurred, and determining 435 that the percentage of available memory is above the minimum threshold, and determining 460 that a request for heap memory by an object in excess of an object threshold value was specified by the developer, advising 465 the developer to avoid the use of large object requests for heap memory. In an embodiment this is contemplated to require the developer to modify the code to reduce the size of the object request by more efficiently breaking the object into smaller pieces.

In response to determining 430 that the heap exhaustion error has occurred, and determining 435 that the percentage of available memory is above the minimum threshold, measuring 470 a maximum number of actual class files, which store bytecodes for subsequent execution by the Jvm 350, and comparing an amount of memory consumed by storing the maximum number of actual class files to an amount of memory reserved for storing the class files. In response to determining 475 that the amount of memory reserved for storing the class files exceeds the amount of memory consumed by storing the maximum number of actual class files by less than a minimum class threshold percentage, advising 480 the developer to increase the amount of memory reserved for storing the class files.

Creating 405 a time series analysis model based upon a historical use of heap memory to predict future usage of heap memory 372 by the Jvm 350. In response to determining 410 that the time series analysis model has an upward trend of heap memory 372 usage, advising 415 the developer to review a heap dump to determine if the possible memory leak exists.

In response to determining 420 that the time series analysis model has a horizontal asymptote as a predicted future time value increases, advising 425 the developer to specify the maximum limit of heap memory 372 as a function of the horizontal asymptote.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for use by a software development tool to assist a software developer in optimizing performance of a Java virtual machine (Jvm), the method comprising:

in response to a heap exhaustion error, which indicates a requested usage of heap memory by the Jvm greater than a maximum limit of heap memory, determining if currently available heap memory, as a percentage of the maximum limit, meets a specified minimum threshold;

in response to the heap exhaustion error, and the percentage of available memory falling below the minimum threshold, advising the developer to review usage of the heap memory;

in response to the heap exhaustion error, and the percentage of available memory being above the minimum threshold, advising the developer to check for fragmentation of the heap memory;

in response to the heap exhaustion error, and the percentage of available memory being above the minimum threshold, determining if an initial heap size selected by the developer exceeds at least one of: a size threshold; and, a ratio to the maximum limit threshold;

in response to the heap exhaustion error, the percentage of available memory being above the minimum threshold, and the at least one of the size threshold and the ratio threshold being exceeded, advising the developer to reduce the initial heap size;

in response to the heap exhaustion error, the percentage of available memory being above the minimum threshold, and a request for heap memory by an object being in excess of an object threshold value specified by the developer, advising the developer to avoid the use of large object requests for heap memory;

in response to the heap exhaustion error, and the percentage of available memory being above the minimum threshold, measuring a maximum number of actual class files, which store bytecodes for subsequent execution by the Jvm, and comparing an amount of memory consumed by storing the maximum number of actual class files to an amount of memory reserved for storing the class files; and in response to the heap exhaustion error, the percentage of available memory being above the minimum threshold, and determining that the amount of memory reserved for storing the class files exceeds the amount of memory consumed by storing the maximum number of actual class files by less than a minimum class threshold percentage, advising the developer to increase the amount of memory reserved for storing the class files;

creating a time series analysis model based upon a historical use of heap memory to predict future usage of heap memory by the Jvm;

in response to the time series analysis model having an upward trend of heap memory usage, advising the developer to review a heap dump to determine if a possible memory leak exists;

in response to the time series analysis model having a horizontal asymptote as a predicted future time value increases, advising the developer to specify the maximum limit of heap memory as a function of the horizontal asymptote.

2. The method of claim 1, wherein:
the creating the time series analysis model comprises a Box-Jenkins Auto-Regressive Integrated Moving Average model.

3. The method of claim 1, wherein:
the creating the time series analysis model comprises a Box-Jenkins Multivariate model.

4. The method of claim 1, wherein:
the creating the time series analysis model comprises a Holt-Winters exponential smoothing model.

5. The method of claim 4, wherein:
the creating the time series analysis model comprises at least one of:
a single exponential Holt-Winters exponential smoothing model;
a double exponential Holt-Winters exponential smoothing model; and
a triple exponential Holt-Winters exponential smoothing model.

6. The method of claim 1, wherein:
in response to the time series analysis model having the horizontal asymptote, advising the developer to specify a value of the maximum limit of heap memory as 30 percent greater than the value of the horizontal asymptote.

7. The method of claim 1, wherein:
in response to the heap exhaustion error, which indicates the requested usage of heap memory by the Jvm greater than the maximum limit, determining if currently available heap memory, as the percentage of the maximum limit, is greater than the specified minimum threshold having a value of 10 percent.

8. The method of claim 1, wherein
in response to the heap exhaustion error, and the percentage of available memory being above the minimum threshold, determining if the initial heap size selected by the developer exceeds at least one of: the size threshold; and, the ratio to the maximum limit threshold having a value of 50 percent.

9. The method of claim 1, wherein:
in response to the heap exhaustion error, the percentage of available memory being above the minimum threshold, and the request for heap memory by the object being in excess of the object threshold having a value of 5 megabytes (MB) specified by the developer, advising the developer to avoid the use of large object requests for heap memory.

10. The method of claim 1, wherein:
in response to the heap exhaustion error, the percentage of available memory being above the minimum threshold, and determining that the amount of memory reserved for storing the class files exceeds the amount of memory consumed by storing the maximum number of actual class files by a value of less than 10 percent, advising the developer to increase the amount of memory reserved for storing the class files.

11. A program storage device readable by a machine, the device embodying a program or instructions executable by the machine to perform the method of claim 1.

12. A data processing system for optimizing performance of a Java virtual machine (Jvm) in the data processing system, the data processing system comprising:
means for creating a time series analysis model based upon a historical use of heap memory to predict future usage of heap memory by the Jvm;
means for advising the developer to review a heap dump, in response to the time series analysis model having an upward trend of heap memory usage, to determine if a possible memory leak exists;
means for advising the developer to specify, in response to the time series analysis model having the horizontal asymptote as a predicted future time value increases, a maximum limit of heap memory as a function of a horizontal asymptote in the time series analysis model prediction of future usage of heap memory;
means for determining, in response to a heap exhaustion error, which indicates a requested usage of heap memory by the Jvm greater than the maximum limit, if currently available heap memory, as a percentage of the maximum limit, meets a specified minimum threshold;
means for advising the developer, in response to the heap exhaustion error, and the percentage of available memory falling below the minimum threshold, to review usage of the heap memory;
means for advising the developer, in response to the heap exhaustion error, and the percentage of available memory being above the minimum threshold, to check for fragmentation of the heap memory;
means for determining, in response to the heap exhaustion error, and the percentage of available memory being above the minimum threshold, if an initial heap size selected by the developer exceeds at least one of: a size threshold; and, a ratio to the maximum limit threshold;
means for advising the developer, in response to the heap exhaustion error, the percentage of available memory being above the minimum threshold, and the at least one of the size threshold and the ratio threshold being exceeded, to reduce the initial heap size;
means for advising the developer, in response to the heap exhaustion error, the percentage of available memory being above the minimum threshold, and a request for heap memory by an object being in excess of an object threshold value specified by the developer, to avoid the use of large object requests for heap memory;
means for measuring, in response to the heap exhaustion error, and the percentage of available memory being above the minimum threshold, a maximum number of actual class files, which store bytecodes for subsequent execution by the Jvm, and comparing an amount of memory consumed by storing the actual maximum number of class files to an amount of memory reserved for storing the class files; and means for advising the developer, in response to the heap exhaustion error, the percentage of available memory being above the minimum threshold, and determining that the amount of memory reserved for storing the class files exceeds the amount of memory consumed by storing the maximum number of actual class files by less than a minimum class threshold percentage, to increase the amount of memory reserved for storing the class files.

13. The system of claim 12, wherein:

the time series analysis model comprises at least one of:

a Box-Jenkins ARIMA model;

a Box-Jenkins Multivariate model; and a Holt-Winters Exponential smoothing model.

14. The system of claim 13, wherein:

the Holt-Winters Exponential smoothing model comprises at least one of:

a single exponential smoothing model;

a double exponential smoothing model; and a triple exponential smoothing model.

* * * * *